(12) United States Patent
Zheng et al.

(10) Patent No.: US 7,519,055 B1
(45) Date of Patent: Apr. 14, 2009

(54) OPTICAL EDGE ROUTER

(75) Inventors: Si Q. Zheng, Plano, TX (US); Yijun Xiong, Plano, TX (US)

(73) Assignee: Alcatel Lucent, Paris (FR)

( * ) Notice: Subject to any disclaimer, the term of this patent is extended or adjusted under 35 U.S.C. 154(b) by 969 days.

(21) Appl. No.: 10/320,220

(22) Filed: Dec. 16, 2002

Related U.S. Application Data

(60) Provisional application No. 60/342,433, filed on Dec. 21, 2001.

(51) Int. Cl.
*H04L 12/56* (2006.01)
(52) U.S. Cl. .................. 370/389; 370/401; 370/474
(58) Field of Classification Search ............. 370/351, 370/389, 392, 400–401, 395.4, 474
See application file for complete search history.

(56) References Cited

U.S. PATENT DOCUMENTS

| | | | | |
|---|---|---|---|---|
| 6,665,495 | B1* | 12/2003 | Miles et al. | 398/54 |
| 6,999,461 | B2* | 2/2006 | Li et al. | 370/400 |
| 7,013,084 | B2* | 3/2006 | Battou et al. | 398/45 |
| 7,088,717 | B2* | 8/2006 | Reeves et al. | 370/392 |
| 7,102,999 | B1* | 9/2006 | Sindhu et al. | 370/235 |
| 2001/0043563 | A1* | 11/2001 | Gerstel et al. | 370/228 |
| 2001/0048662 | A1* | 12/2001 | Suzuki et al. | 370/230 |
| 2002/0118682 | A1* | 8/2002 | Choe | 370/395.31 |
| 2002/0159449 | A1* | 10/2002 | Carson et al. | 370/389 |
| 2005/0018609 | A1* | 1/2005 | Dally et al. | 370/235 |
| 2005/0058128 | A1* | 3/2005 | Carson et al. | 370/388 |
| 2006/0140185 | A1* | 6/2006 | Norman et al. | 370/389 |
| 2007/0036546 | A1* | 2/2007 | Islam | 398/51 |

OTHER PUBLICATIONS

Qiao, et al.; Optical Burst Switching (OBS)—A New Paradigm for an Optical Internet; Journal of High Speed Networks 1999; vol. 8, pp. 69-84.

Turner, J.; Terabit Burst Switching; Journal of High Speed Networks 1999; vol. 8, pp. 3-16.

* cited by examiner

*Primary Examiner*—Ricky Ngo
*Assistant Examiner*—Pao Sinkantarakorn

(57) ABSTRACT

An ingress edge router (6) couples a set of input links (13) carrying packet information to a set of output links (14) carrying burst information. A plurality of input line cards (30) route information packets to one of a plurality of output line cards (32) associated with a desired output link (14) over a switching matrix (34). The output line cards (32) assemble information packets into data bursts, generate burst header packets for respective data bursts, and transmit the data bursts and burst header packets on the output links (14). The output line cards (32) include a plurality of burst processing units (40) for assembling data from the packets into data bursts, a plurality of transmitters (46) for transmitting data bursts on a respective channel of an output link and a switch (42) for passing bursts from a burst processing unit to a transmitter under control of a burst control unit (44).

26 Claims, 8 Drawing Sheets

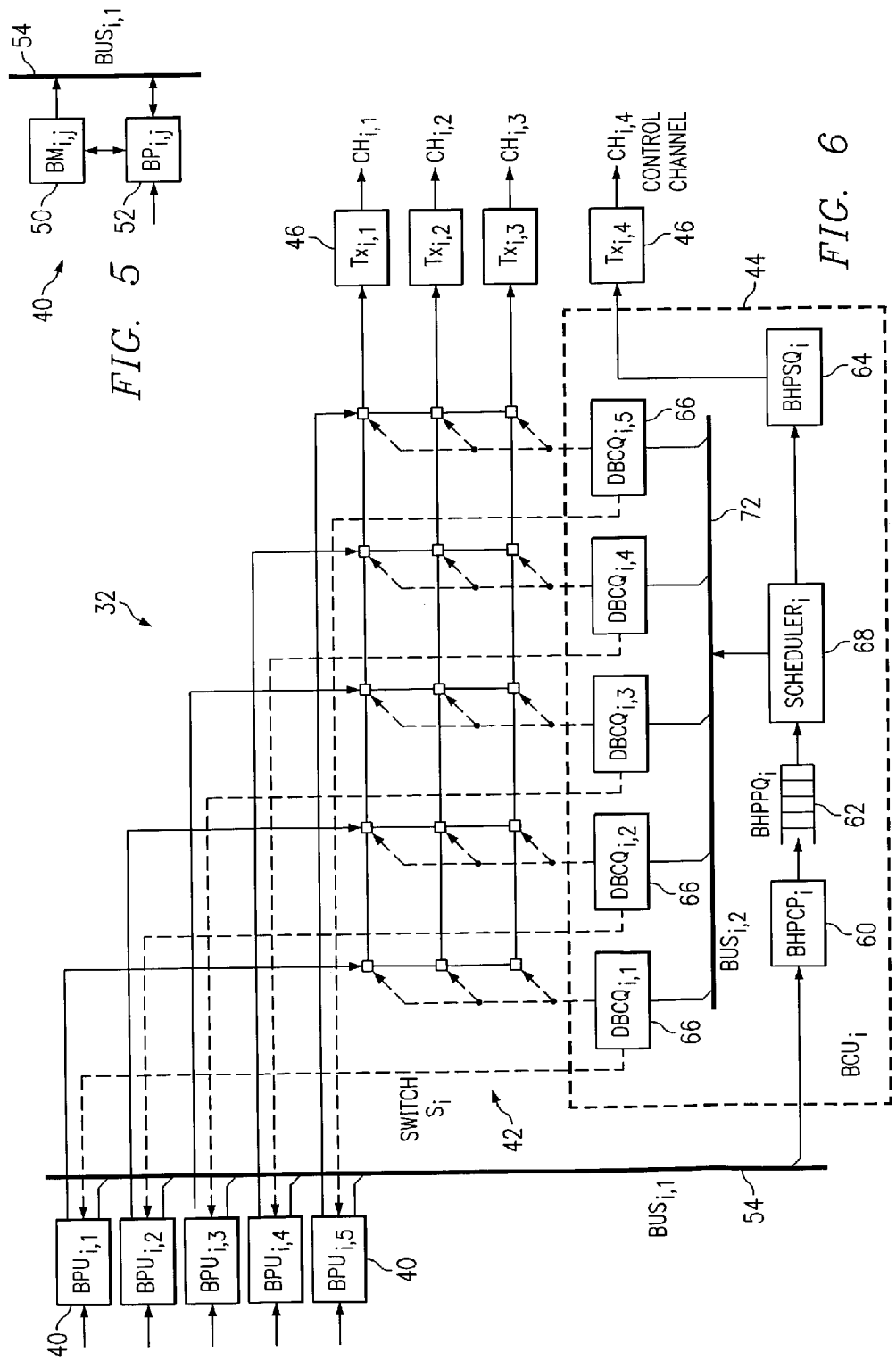

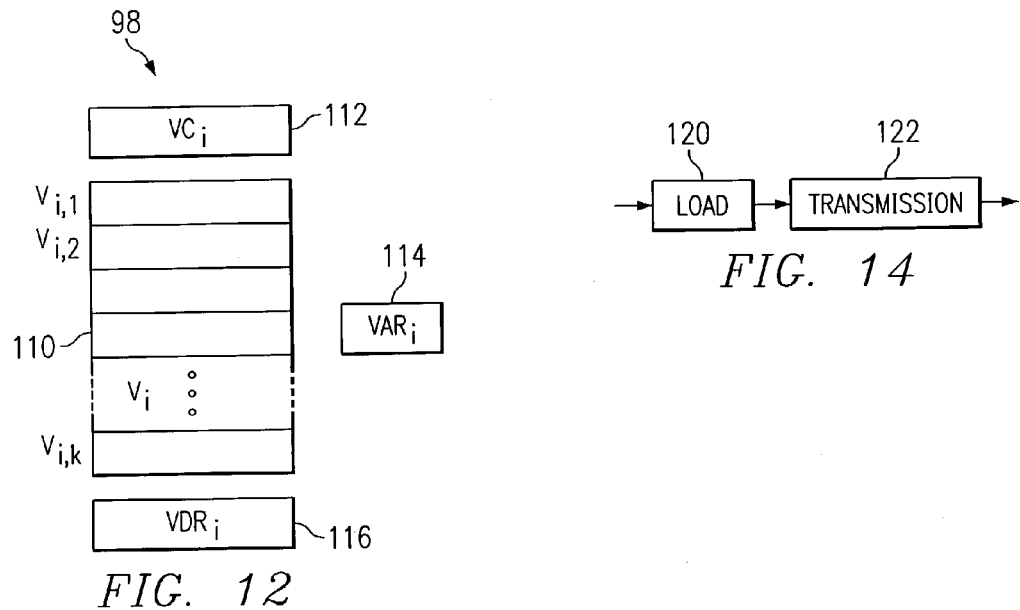
FIG. 12
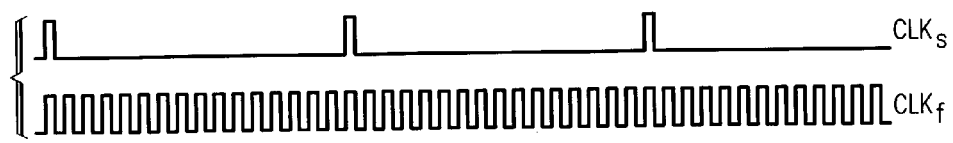
FIG. 14
FIG. 13
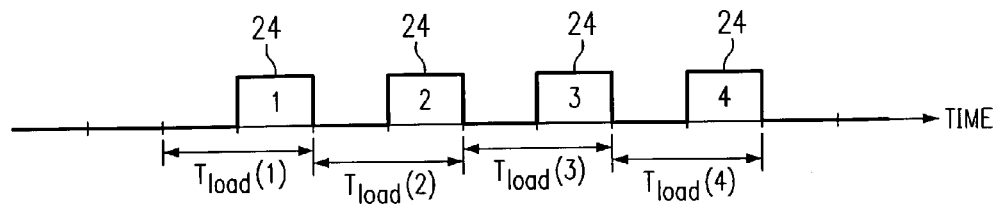
FIG. 16a
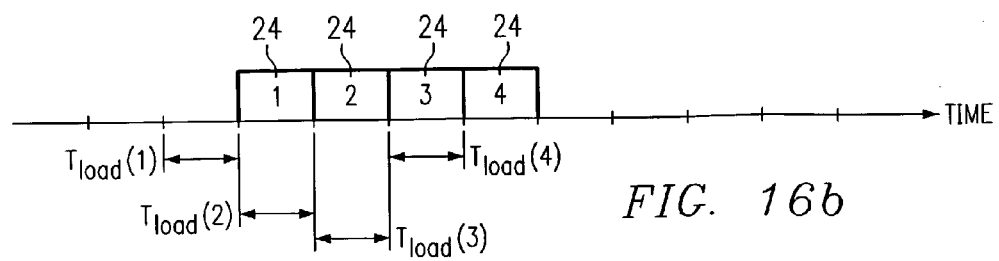
FIG. 16b

OPTICAL EDGE ROUTER

CROSS-REFERENCE TO RELATED APPLICATIONS

This application claims the benefit of the filing data of copending provisional application U.S. Ser. No. 60/342,433, filed Dec. 21, 2001, entitled "Ingress Edge Router" to Zheng et al.

This application is related to U.S. Ser. No. 09/569,488 filed May 11, 2000, entitled, "All-Optical Networking Optical Fiber Line Delay Buffering Apparatus and Method", which claims the benefit of U.S. Ser. No. 60/163,217 filed Nov. 2, 1999, entitled, "All-Optical Networking Optical Fiber Line Delay Buffering Apparatus and Method" and is hereby fully incorporated by reference. This application is also related to U.S. Ser. No. 09/409,573 filed Sep. 30, 1999, entitled, Control Architecture in Optical Burst-Switched Networks" and is hereby incorporated by reference. This application is further related to U.S. Ser. No. 09/689,584, filed Oct. 12, 2000, entitled "Hardware Implementation of Channel Scheduling Algorithms For Optical Routers With FDL Buffers," which is also incorporated by reference herein.

This application is further related to U.S. Ser. No. 09/997,851, filed Nov. 29, 2001, entitled "Channel Scheduling in Optical Routers", U.S. Ser. No. 09/998,293, filed Nov. 29, 2001, entitled "Unified Associative Memory of Data Channel Scheduler in an Optical Router" to Zheng et al and U.S. Ser. No. 09/997,849, filed Nov. 29, 2001, entitled "Optical Burst Scheduling Using Partitioned Channel Groups" to Zheng et al, all of which are incorporated by reference herein.

BACKGROUND OF THE INVENTION

1. Technical Field

This invention relates in general to optical networks and, more particularly, to optical ingress router.

2. Description of the Related Art

Data traffic over networks, particularly the Internet, has increased dramatically recently, and will continue as the user increase and new services requiring more bandwidth are introduced. The increase in Internet traffic requires a network with high capacity routers capable of routing data packets of variable length. One option is the use of optical networks.

The emergence of dense-wavelength division multiplexing (DWDM) technology has improved the bandwidth problem by increasing the capacity of an optical fiber. However, the increased capacity creates a serious mismatch with current electronic switching technologies that are capable of switching data rates up to a few hundred gigabits per second, as opposed more than one terabit per second potential capability of a single DWDM fiber (a fiber optical cable contains twenty-four fibers). While emerging IP routers may be used to switch data using the individual channels within a fiber, typically at a few terabits per second, this approach implies that tens or hundreds of switch interfaces must be used to terminate a single DWDM fiber with a large number of channels. This could lead to a significant loss of statistical multiplexing efficiency when the parallel channels are used simply as a collection of independent links, rather than as a shared resource.

Different approaches advocating the use of optical technology in place of electronics in switching systems have been proposed; however, the limitations of optical component technology has largely limited optical switching to facility management/control applications. One approach, called optical burst-switched networking, attempts to make the best use of optical and electronic switching technology. The electronics provides dynamic control of system resources by assigning individual user data bursts to channels of a DWDM fiber, while optical technology is used to switch the user data channels entirely in the optical domain.

One important part of an optical network is the edge routers and, in particular, the ingress edge routers. The function of an ingress edge router include routing the IP packets, assembling IP packets into data bursts according to the addresses of their destination egress edge routers and other information (e.g. packet classes for quality of service purposes), generating burst header packets and scheduling the data bursts and control information for their transmission on output optical channels. The goal is to carry out all these functions efficiently. The main technical problem in the design of edge routers is how to feed the high-speed optical pipes efficiently, which is critical to the overall efficiency of an optical burst switched network.

Therefore, a need has arisen for a method and apparatus for providing an efficient ingress routers for an optical burst-switched network.

BRIEF SUMMARY OF THE INVENTION

In the present invention, an ingress edge router couples a set of input links carrying packet information to a set of output links carrying data bursts and related control information. A plurality of input line cards router information packets towards a desired output link. A plurality of output line cards assemble information packets into data bursts, generate burst header packets for respective data bursts, and transmit the data bursts and burst header packets on the output links. A switching matrix transfers packets from the input line cards to the output line cards for transmission on the desired output link.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which:

FIG. 5 illustrates a block diagram of a burst processing unit (BPU) used in the OLC of FIG. 4;

FIG. 6 illustrates a more detailed block diagram of an OLC;

FIG. 12 illustrates an associative processor (PV) used in the scheduling circuit of FIG. 10;

FIG. 13 illustrates timing diagrams for a $CLK_s$ and a $CLK_f$;

FIG. 14 illustrates a two-stage pipeline describing the load/transmission of a transmitter in the OLC of FIG. 6;

FIGS. 16a through 16b illustrate a second example of data burst loading an transmission.

DETAILED DESCRIPTION OF THE INVENTION

The present invention is best understood in relation to FIGS. 1-16 of the drawings, like numerals being used for like elements of the various drawings.

Figure 1:
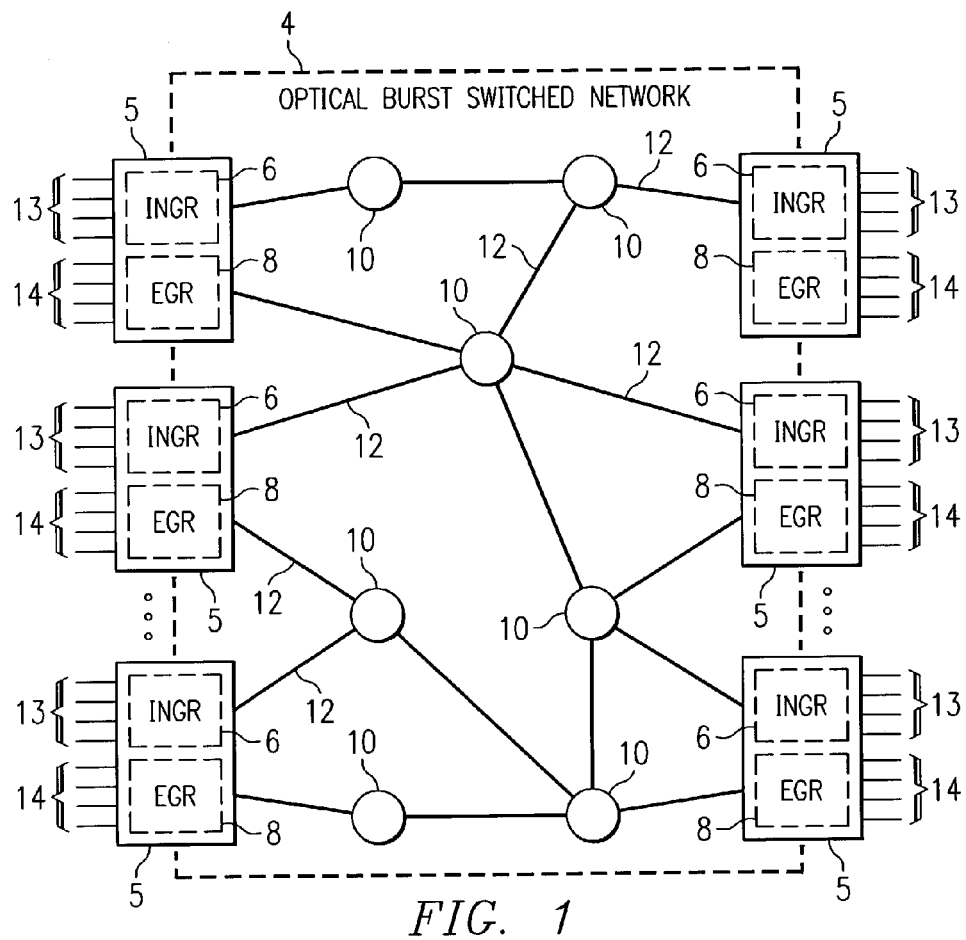
FIG. 1 illustrates a block diagram of a dense wavelength division multiplexing optical burst switching network.

FIG. 1 illustrates a DWDM (dense wavelength division multiplexing) optical burst switching (OBS) network 4 including edge routers 5 and optical core routers 10 coupled by optical links 12. An edge router 5 can be considered as a combination of an ingress edge router 6 and an egress edge router 8. An ingress edge router 6 received data from outside the OBS network 4 over input links 13 and passes the data to a set of optical links 12 within the OBS network 4. An egress edge passes data from a set of optical links 12 within the OBS network 4 to a set of output links 14. Each optical link 12 carries of a set of channels, each channel using a different wavelength. A core router 10 communicates with other core routers 10 and edge routers 5 over optical links 12.

Figure 2:
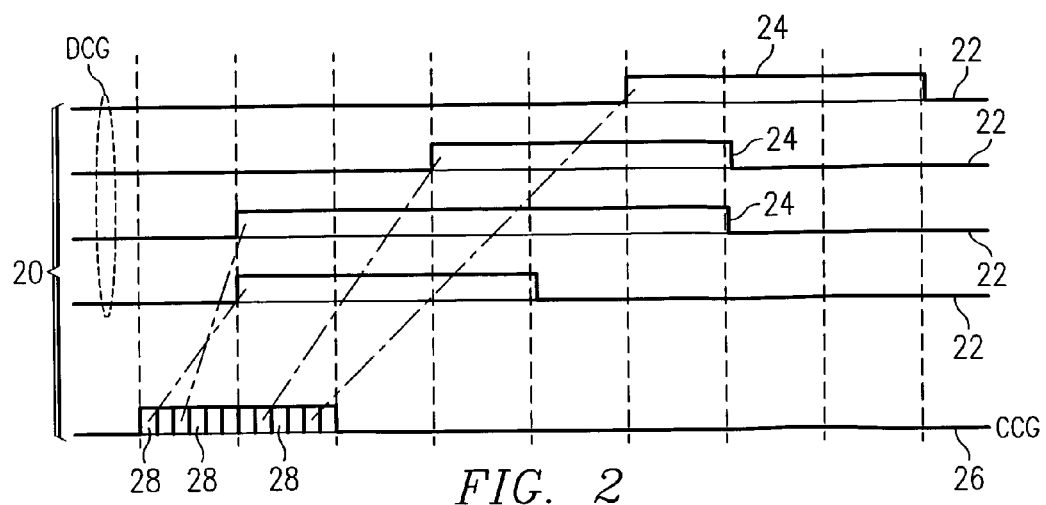
FIG. 2 illustrates the channels of an optical link 12 divided into two groups: a data channel group (DCG) and control channel group (CCG)

As shown in FIG. 2, the channels 20 of an optical link 12 are divided into two groups: a data channel group (DCG) and control channel group (CCG). A data channel 22 is used to carry data bursts (DBs) 24 and a control channel 26 carries burst header packets (BHPs) 28. IP packets received from the input of an ingress edge router 6 are assembled into bursts 24 based on egress edge router addresses and other information. Each data burst 24 is transmitted along a transparent all-optical path. The transmissions of DBs 24 and BHPs 28 are separated. Each BHP 28, which carries the routing information, is sent ahead its associated DB 24 by a nonnegative offset time. At each core router 10 on the path leading to the destination egress router 8, a BHP 28 is processed electronically to reconfigure the optical switch of the core router 10, allowing the associated DB 24 that follows to pass without O/E (optical to electronic) and E/O (electronic to optical) conversions. While the initial value is set by the ingress edge router 6, the offset time may vary hop by hop as a BHP 28 and its DB 24 traverse across the network. The bursts received at an egress (destination) edge router 89 are disassembled into packets.

The functions of an ingress edge router 6 in an OBS network 4 include routing the IP packets received from incoming links 13, assembling IP packets into data bursts 24 according to the addresses of their destination egress edge routers 8 and other information (e.g. packet classes for QoS purposes), generating burst header packets 28 and scheduling the DBs 24 and BHPs 28 for their transmissions on output optical channels 20. The goal is to carry out all these functions efficiently. The efficiency is measured by the speed of channel scheduling and the utilization of all output optical channels. A major challenge in the design of routers in an OBS network is to maximize the utilization of optical bandwidth.

Figure 3:
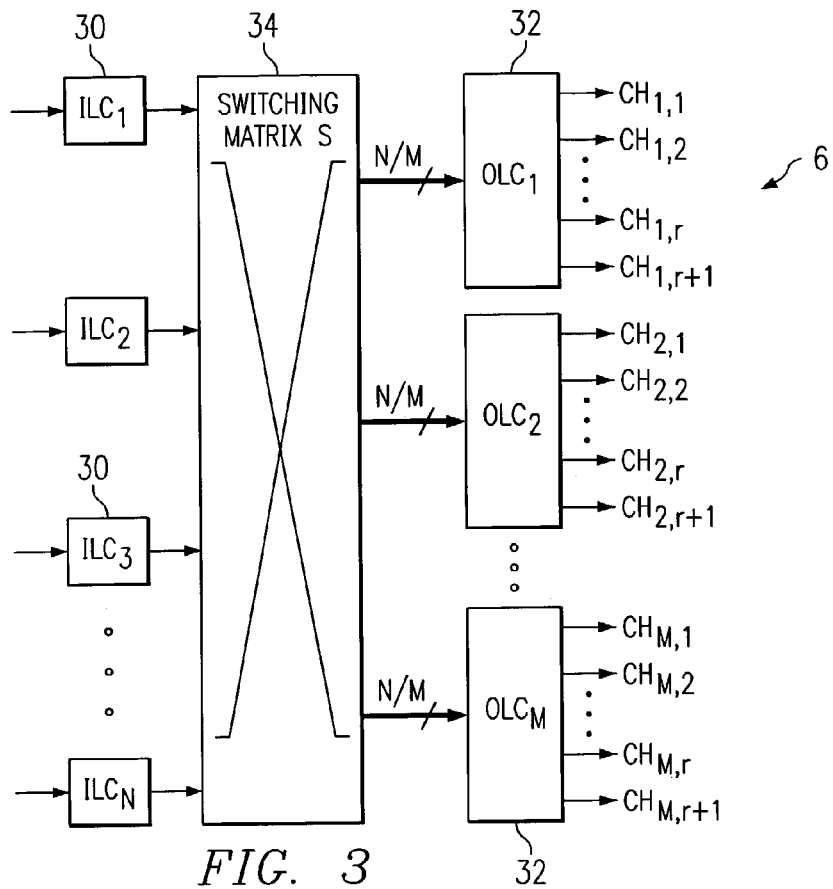
FIG. 3 illustrate a block diagram of an ingress edge router.

FIG. 3 illustrates a block diagram of an ingress portion 6 of the edge router 5, having N input links and M output links (the egress portion 8, which converts data bursts to electrical data packets, would pass optical information in the opposite direction, but is not shown for ease of illustration). Without loss of generality, assume that output link i has r+1 channels (wavelengths), with r channels $Ch_{i,j}$, $1 \leq j \leq r$, used as data channels 22 (which form a DCG) and one channel $Ch_{i,r+1}$ as the control channel 26 (which by itself forms the CCG). With this assumption, the scheduling method for each link 12 is sequential, i.e. the data bursts 24 for a single link 12 are scheduled sequentially, one after another, whereas the data bursts 24 for different links 12 can be scheduled in parallel. In a real implementation, the optical channels 20 of a link may be divided into several (for example, two) partitions, each being treated as a virtual link with a DCG of multiple data channels 22 and a CCG of one control channel 26. Then, the data bursts 24 for a link 12 can be scheduled in parallel on different virtual links.

Associated with each input link 13, there is an input line card (ILC) 30 and associated with each output optical link 12, there is an output line card (OLC) 32 (each ILC 30 and OLC 32 may be connected to more than one link). There is a switching matrix (S) 34 between ILCs 30 and OLCs 32. Assuming N>M, there are N/M connections from the output of switching matrix 34 to each OLC 32. The main function of each ILC 30 is to route input packets to appropriate OLCs 34 by routing table lookup.

Figure 4:
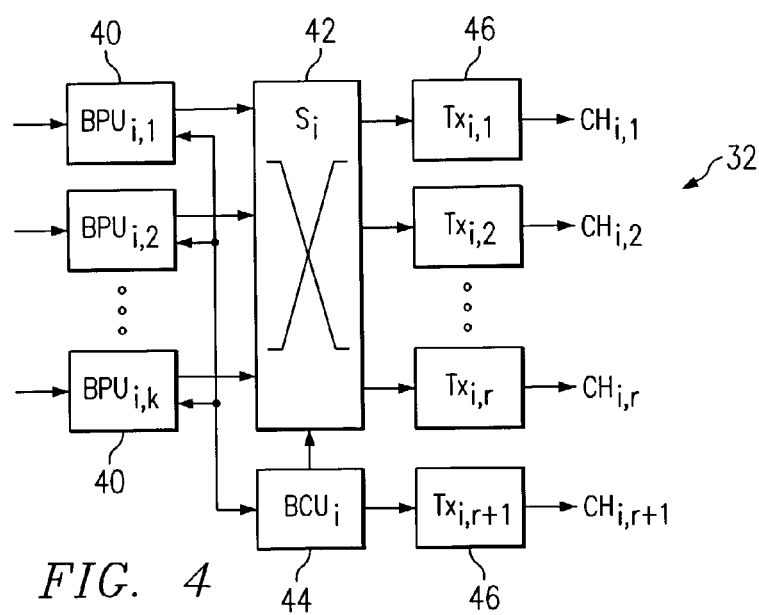
FIG. 4 illustrates a general block diagram of an output line card (OLC) used in the ingress edge router of FIG. 3.

FIG. 4 illustrates a general block diagram of an OLC 32. There are M OLCs 32, $OLC_i$, $1 \leq i \leq M$ in an ingress edge router 6. Each $OLC_i$ consist of k burst processing units 40 ($BPU_{i,j}$, $1 \leq j \leq k$, k=N/M), a switch 42 ($S_i$), a burst control unit 44 ($BCU_i$), and r+1 transmitters. Within a OLC 32, switch 42 couples BPUs 40 with the transmitters 46 under control of BCU 44. It is assumed that DBs 24 and BHPs 28 are transmitted in terms of slots, with each lost comprising Y bytes. Since the implementation of interconnections between ILCs 30 and OLCs 32 is similar to electronic routers, only the details of the design of an OLC is discussed herein.

In a slotted transmission mode, DBs 24 are transmitted in units of slots, as shown in FIG. 2, and BHPs 28 are transmitted as groups, and each group is carried by a slot. All slots have the same size. A slot clock, $CLK_s$ is used to determine the slot boundary.

FIG. 5 illustrates a block diagram of a BPU 40. Each $BPU_{i,j}$ of $OLC_i$ includes a burst memory 50 ($BM_{i,j}$) and a burst processor 52 ($BP_{i,j}$). Both $BM_{i,j}$ and $BP_{i,j}$ are connected to a bus 54 ($Bus_{i,1}$) in $OLC_i$. Each $BPU_{i,j}$ 40 assembles its received packets into DBs 24, and prepares burst header packets (BHPs) 28 for these DBs 24. It is assumed that BHP length, in terms of number of bytes, is variable. Without loss of generality, it is assumed that a BHP includes, but not restricted to, the following fields:

bhp_length: number of bytes used for the BHP.

db_length_b: number of bytes in the corresponding DB.

db_length_s: number of slots used to transmit the corresponding DB; db_length_s=⌈db_length_s/Y⌉, where Y is the number of bytes in a slot.

db_type: type of the corresponding DB.

destination: address of the burst's destination egress edge router.

offset: number of slots the BHP is transmitted ahead of the transmission of its corresponding DB.

db_channel: identification of the output data channel on which the corresponding DB is transmitted.

A BPU 40 prepares a BHP template for each DB 24. In addition to all the fields mentioned above, the following two fields are also included in a BHP template:

bpu_identifier: the identifier j of the $BPU_{i,j}$ that stores the corresponding DB.

db_address: starting address of the corresponding DB in $BM_{i,j}$.

This information is needed for scheduling and loading the corresponding DB 24 into a transmitter, but it is not included in the final BHP 28 to be transmitted.

For a BHP template (or a BHP) H, the notation H.x is used to refer to field x of H; e.g. H.bhp_length and H.db_length_b are used to refer to field bhp_length and db_length_b of H, respectively. For an ingress edge router 6, the value of offset is a constant $T_{offset}$, in terms of number of slots. Except for the field db_channel, whose value will be determined by $BCU_i$ 44, all fields of a BHP template mentioned above are filled by the BPU 40 that stores the corresponding DB 24.

There is a flag $READY_{i,j}$ associated with $BPU_{i,j}$, $READY_{i,j}=1$ if and only if there is an assembled DB (and its BHP template) in $BPU_{i,j}$ ready to be scheduled by burst control unit $BCU_i$ for transmission. When $BPU_{i,j}$ is selected by $BCU_i$ through $Bus_{i,1}$, $BPU_{i,j}$ provides a BHP template to $BCU_i$. $BCU_i$ uses this BHP template to schedule the transmission time of its corresponding BHP and DB. When $BPU_{i,j}$ receives a signal from $BCU_i$ for loading a DB into the transmitter of its scheduled data channel, it loads the DB 24 into the transmitter 46 of that channel from $BPU_{i,j}$ through switch $S_i$.

Referring again to FIG. 4, in each OLC 32, there are r optical transmitters 46 ($Tx_{i,j}$, $1 \leq j \leq r$), for transmitting DBs 24. They transmit DBs 24 received from BPUs 40 over their data channels 22. There is one transmitter, $TX_{r+1}$, for transmitting BHPs 28. This transmitter transmits BHPs 28 received from $BCU_i$ over control channel $Ch_{i,r+1}$.

Each transmitter 46 is equipped with sufficient buffer space. Loading the buffer of a transmitter $Tx_{i,j'}$ from a burst memory $BM_{i,j}$ (see FIG. 5) requires setting a path between them in the BCU/Transmitter switch 42, and reading from $BM_{i,j}$. This task is carried out by burst control unit $BCU_i$ (more precisely, by $DBCQ_{i,j}$ of $BCU_i$, as described in connection with FIG. 6). The DB 24 loaded into the buffer of a transmitter 46 is transformed into frames suitable for slot transmission by a special circuit on-the-fly during loading.

BPU/Transmitter switch 42 is used to load a burst in any $BPU_{i,j}$, $1 \leq j \leq N/M=k$, into any transmitter $Tx_{i,j'}$, $1 \leq j' \leq r$. To fully utilize the optical bandwidth of all optical data channels $Ch_{i,j'}$, $1 \leq j' \leq r$, one should choose $k \geq r$. Switch 42 can be a k-by-r crossbar switch, or a non-blocking multistage interconnection network of k inputs and r outputs. In the example shown in FIG. 6, below, k=5, r=3, and a 5-by-3 crossbar switch is used.

The functions of $BCU_i$ include: (1) selecting BHP templates from $BPU_{i,j}$, $1 \leq j \leq k$ for scheduling, (2) scheduling BHPs constructed from selected BHP templates, and their corresponding DBs, (3) generating control signals for establishing data transmission paths from $BPU_{i,j}$, $1 < j < k$, to $Tx_{i,j'}$, $1 < j' < r$, in the BPU/Transmitter Switch and (4) generating control signals for loading DBs from $BPU_{i,j}$, $1 \leq j \leq k$, into transmitters $Tx_{i,j'}$, $1 < j' < r$, of the data channels and loading BHPs into the transmitter $Tx_{r+1}$ of the control channel.

FIG. 6 illustrates a more detailed block diagram of an OLC 32. The burst control unit $BCU_1$ 44 of $OLC_i$ includes: (1) a BHP collecting processor $BHPCP_i$ 60, a BHP priority queue $BHPPQ_i$ 62, a BHP slot queue $BHPSQ_i$ 64, k data burst control queues $DBCQ_{i,j}$ 66, a scheduler $SCHEDULER_i$ 68, a first bus, $Bus_{i,1}$ 54, connecting $BPU_{i,j}$s and $BHPCP_i$, and a second bus $Bus_{i,2}$ 72 connecting $DBCQ_{i,j}$s 66 and $SCHEDULER_i$ 68.

Each BCU 44 includes a BHP collecting processor $BHPCP_i$ 60 and a BHP template priority queue $BHPPQ_i$ 62. The major functions of $BHPCP_i$ 60 include: (1) reading BHP templates of those assembled DBs from $BPU_{i,j}$, $1 \leq j \leq k$, according to a polling priority scheme defined for BPUs and (2) inserting BHP templates into a BHP priority queue $BHPPQ_i$ 62 according to a priority scheme based on DB types to improve quality of services (QOS).

The first bus, $Bus_{i,1}$ 54, connects all BPUs 40 in $OLC_i$ 32 to $BHPCP_i$ 60. Flag $READY_{i,j}$ in $BPU_{i,j}$ being set to "1" indicates that there is a DB 24 in $BPU_{i,j}$ 40 ready for scheduling (and transmission). When $READY_{i,j}=1$ for any j, an interrupt signal is generated. Different priority schemes can be used to assign priorities to BPUs 40, and processor $BHPCP_i$ 60 processes the interrupts according to a selected priority scheme. For example, one may use the linear order of j to assign priorities to $BPU_{i,j}$s. In such a scheme $BPU_{i,1}$ has the highest priority and $BPU_{i,k}$ has the lowest priority. To implement such a scheme, one may use a daisy chain to chain the READY flags according to their priorities. In such a way, for all those BPUs whose READY flags are set, the one with the highest priority is selected by the interrupt service routine of $BHPCP_i$ 60.

Figure 7:
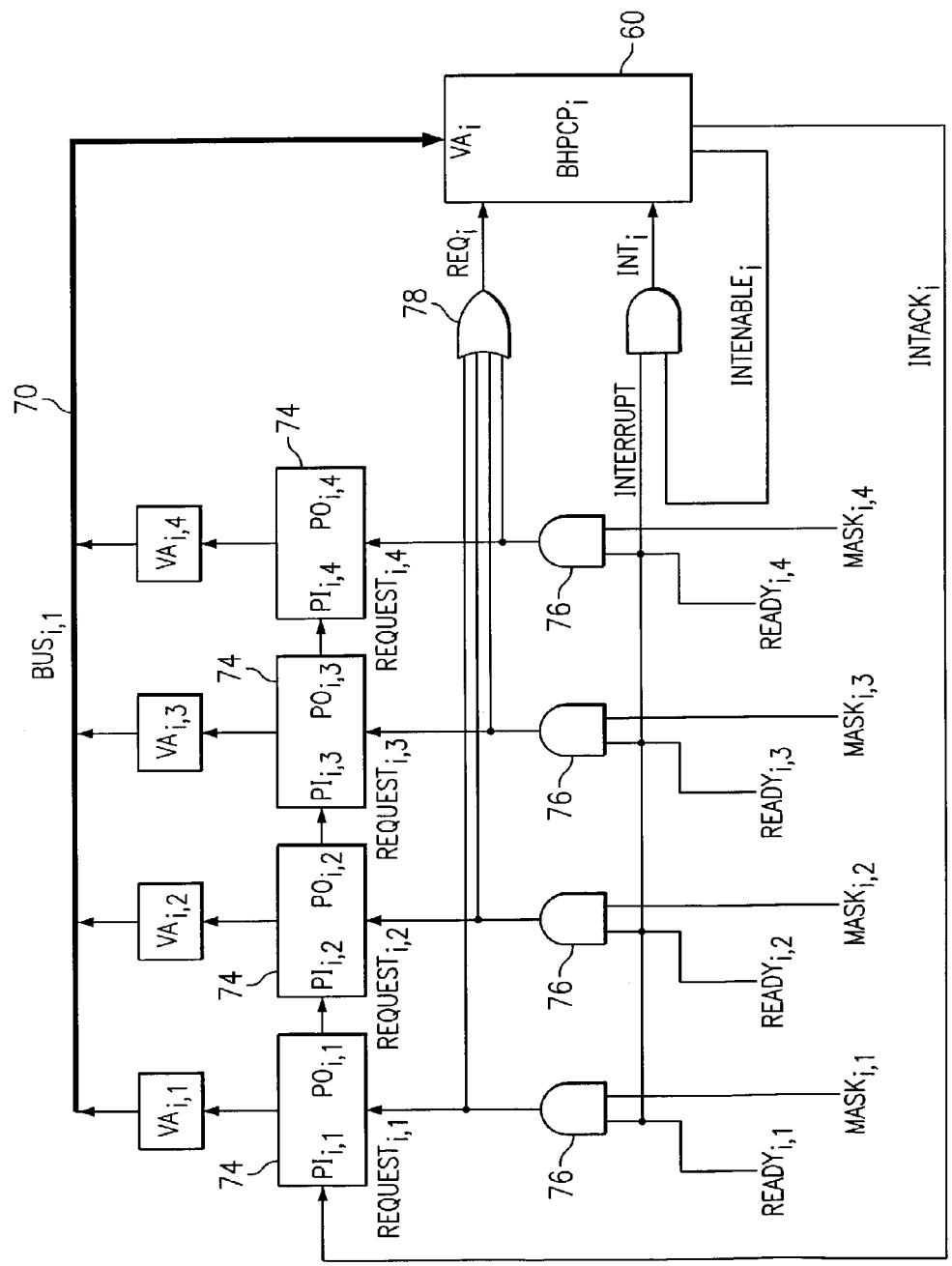
FIG. 7 illustrates a block diagram of a daisy chain circuit for use in the OLC of FIG. 6.

A daisy cain can also be used to implement an approximate round robin priority scheme to enforce fairness; a block diagram of such a daisy chain is shown in FIG. 7. For each $BPU_{i,j}$, there is an additional flag $MASK_{i,j}$. $REQUEST_{i,j}$ is a logical AND (76) of $MASK_{i,j}$ and $READY_{i,j}$. $REQ_i$ is a logical OR (78) of all the $REQUEST_i$ signals. The flags $MASK_{i,j}$ can be set and reset by $BHPCP_i$ 60. The chain has k stages 74, with stage j having three inputs, $PI_{i,j}$, READY, and $MASK_{i,j}$, and two outputs, $PO_{i,j}$ and $VA_{i,j}$. The output $PO_{i,j}$ of stage j, $1 \leq j \leq k-1$, is the input $PI_{i,j+1}$ of stage j+1. The relations between input READYs, MASKS and PIs and output POs and VAs are given in Table 1. An "x" in the table indicates a "don't care" condition.

TABLE I

| $PI_{i,j}$ | $READY_i$ | $Mask_{i,j}$ | $PO_{i,j}$ | $VA_{i,j}$ |
| --- | --- | --- | --- | --- |
| 0 | x | x | 0 | disabled |
| 1 | 0 | x | 1 | disabled |
| 1 | 1 | 1 | 0 | disabled |
| 1 | 1 | 0 | 1 | disabled |

When one of the READY signals is "1" and an interrupt is enabled by $INTENABLE_i$, an interrupt signal $INT_i$ is generated. After the interrupt request is acknowledged by $BHPCP_i$ (which sets $INTACK_i$ to "1"), only the vector address $VA_{i,j'}$ is inserted into the bus $Bus_{i,1}$, where j'=min $\{REQUEST_{i,j}=1 | 1 \leq j \leq k\}$ if and only if $REQ_i=1$.

When one of the READY signals is "1" and an interrupt is enabled by $INTENABLE_i$, and interrupt signal $INT_i$ is generated. After the interrupt request is acknowledged by $BHPCP_i$ (which sets $INTACK_i$ to "1"), only the vector address $VA_{i,j'}$ is inserted into the $Bus_{i,1}$, where j'=min $\{REQUEST_{i,j}=1 | 1 \leq j \leq k\}$ if and only if $REQ_i=1$.

When there is an interrupt (i.e. $INT_i=1$) and the interrupt is enabled (i.e. $INTENABLE_i=1$), the interrupt is acknowledged (i.e. $INTACK_i=1$). Then, the interrupt service routine of $BHPCP_i$ 60 is invoked. An interrupt service procedure for $BHPCP_i$ 60 could be defined as:

procedure InterruptSevice
  begin
    $INTENABLE_1 \leftarrow 0$;
    if $REQ_i=0$ then $MASK_{i,j} \leftarrow 1$ for $1 \leq j \leq r$;
    $a \leftarrow VA_i$;
    read from $BM_{i,a}$ a BHP template from $BPU_{i,a}$ and insert the template into $BHPPQ_i$;
    $MASK_{i,b} \leftarrow 0$;
    $INTENABLE_i \leftarrow 0$
  end If $READY_{i,j}=1$ for all $1 \leq j \leq k$, this interrupt service routine, together with the daisy chain design, ensures a round robin priority scheme. In general, if there are several BPUs whose READY signals are "1"s, no BPU will be polled consecutively.

The priority queue $BHPPQ_i$ 62 is a dual-port memory. The BHP templates in $BHPPQ_i$ 62 are maintained in order according to a selected DB priority scheme. The field db_type and the arrival time of BHP templates can be used to determine the order of BHP templates in $BHPPQ_i$ 62. The BHP templates are fetched by $SCHEDULER_i$ 68 for data and control channel scheduling.

Figure 8:
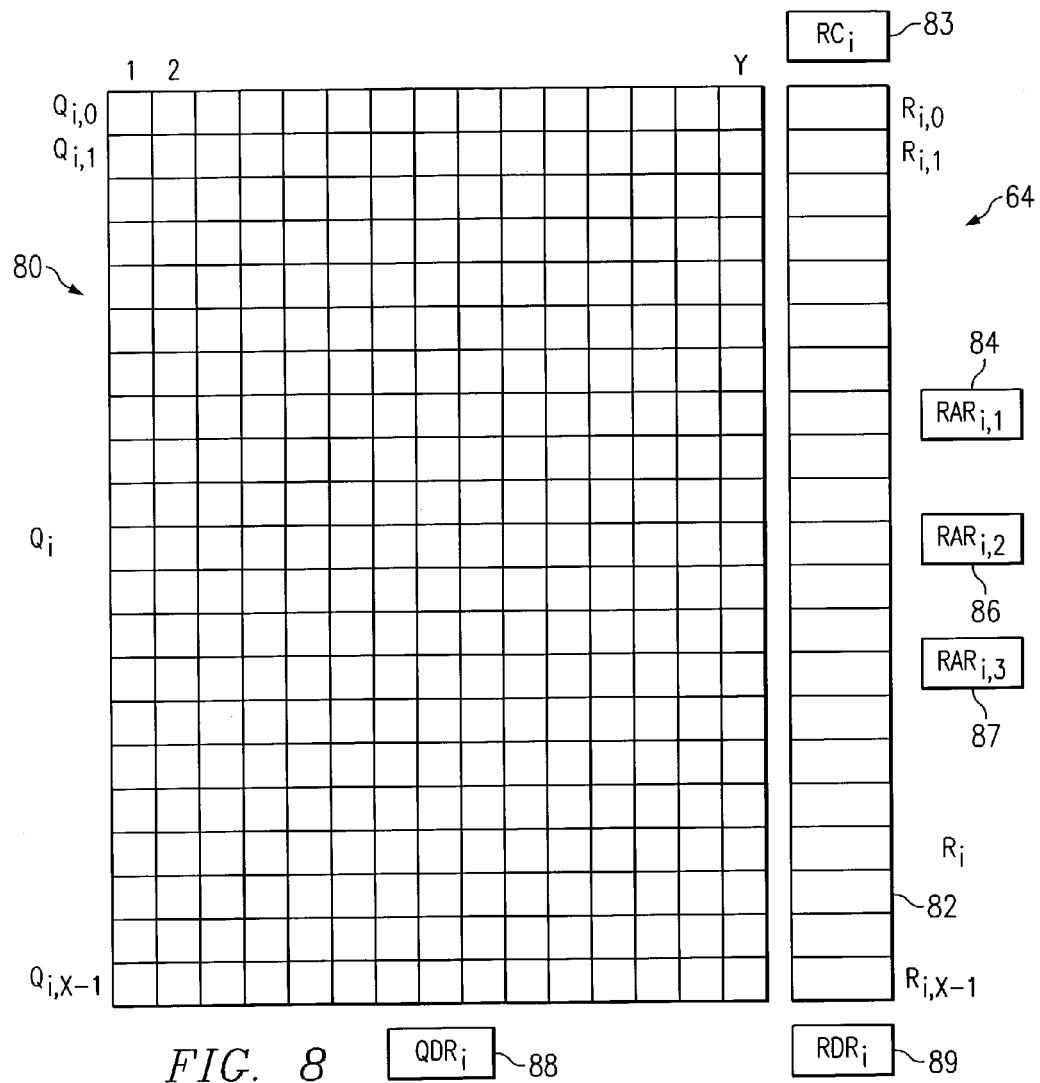
FIG. 8 illustrates a BHP slot queue (BHPSQ) used in the OLC of FIG. 6.

FIG. 8 illustrates a block diagram of a BHPSQ slot queue 64. The BHP slot queue $BHPSQ_i$ 64 in $BCU_i$ 44 includes $Q_i$ 80, a random access memory of X superwords $Q_{i,0}$, $Q_{i,1}, \ldots, Q_{i,x-1}$, where each superword has Y bytes, and it is used to contain several BHPs for transmission by one slot. $Q_i$ can be considered as a two-dimensional array. $R_i$ 82 is an associative memory of X superwords $R_{i,0}, R_{i,1}, \ldots, R_{i,x-1}$. $RC_i$ 83 is a comparand register. It holds an operand to be compared with. $RAR_{i,1}$ 84, $RAR_{i,2}$ 86, and $RAR_{i,3}$ 87 are address registers used to hold addresses for addressing $Q_i$ and R2. $QDR_i$ 88 and $RDR_i$ 89 are data registers. Together with $RAR_{i,1}$ and $RAR_{i,2}$, they are used to access and $R_i$. The length of $QDR_i$ is not shorter than any BHP length.

$BHPSQ_i$ 64 supports the following operations:

PARALLEL_SEARCH1: Given a value in $RC_i$, and an address y in $RAR_{i,2}$, the value of $RC_i$ is compared with all words $R_{i,y}, R_{i,y+1}, \ldots, R_{i,x-1}$ simultaneously. Find the smallest a such that $R_{i,a} \geq RC_i$ and $a \geq RAR_{i,2}$, and do $RAR_{i,3} \leftarrow a$, $RDR_i \leftarrow R_{i,a}$. If such an a does not exist, set $RAR_{i,3}=0$.

PARALLEL_SEARCH2: Given a value in $RC_i$, and an address y in $RAR_{i,1}$, the value of $RC_i$ is compared with all words $R_{i,0}, R_{2,1}, \ldots, R_{i,y-1}$ simultaneously. Find the smallest a such that $R_{i,a} \geq RC_i$ and $a<RAR_{i,1}$, and do $RAR_{i,3} \leftarrow a$, $RDR_i \leftarrow R_{i,a}$. If such an a does not exist, set $RAR_{i,3}=0$.

CONTROL_CHANNEL_LOAD: If $R(RAR_{i,1}) \neq Y$ then read $Q(RAR_{i,1})$ into the buffers in $Tx_{i,r+1}$; $R(RAR_{i,1}) \leftarrow Y$; $RAR_{i,1} \leftarrow (AR_{i,1}+1)$ mod X.

BHPSQ_WRITE(H"): Write byte 1 through byte H".bhp_length of $QDR_i$ into byte $Y-R(RAR_{i,3})+1$ through Max$-R(RAR_{i,3})+H$".bhp_length$-1$ of $Q(RAR_{i,3})$; $R(RAR_{i,3}) \leftarrow R(RAR_{i,3})-H$".bhp length$-1$.

Operation CONTROL_CHANNEL_LOAD is triggered by every clock pulse of $CLK_s$. Operation BHPSQ_WRITE is performed after the load time of a BHP is computed by $BCU_i$. Using an additional barrel shifter (a special shift register), the speed performance of BHPSQ_WRITE operation can be improved significantly.

Figure 9:
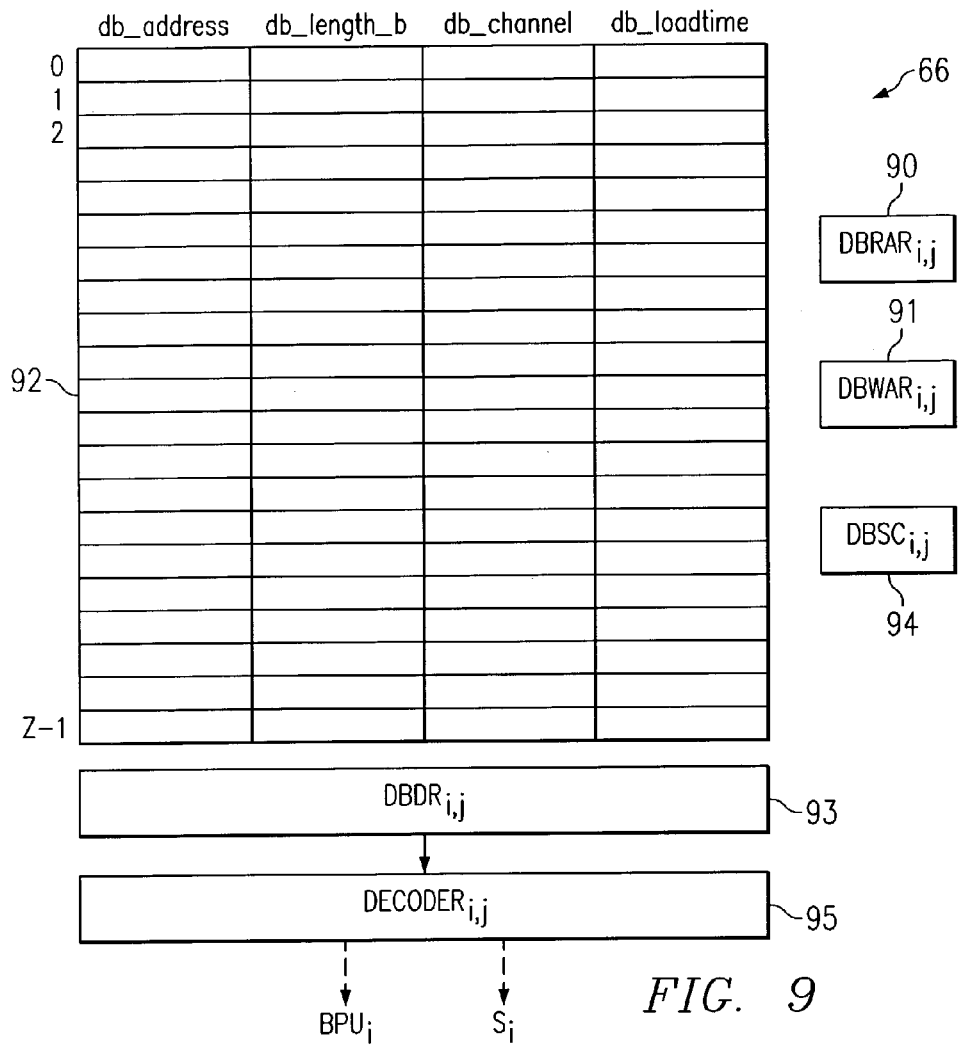
FIG. 9 illustrates a data burst control queue (DBCQ) used in the OLC of FIG. 6.

FIG. 9 illustrates a structure for the DBCQ 66. As shown in FIG. 6, for each $BPU_{i,j}$ 40, there is a data burst control queue $DBCQ_{i,j}$ 66 in $BCU_i$ 44. There are two address registers for $DBCQ_{i,j}$: read address register $DBRAR_{i,j}$ 90 and write address register $DBWAR_{i,j}$ 91, which are used to specify an address for read and write, respectively. There is a data address register $DBDR_{i,j}$ 93, which is used for storing a superword to be written into $DBCQ_{i,j}$.

Each $DBCQ_{i,j}$ includes a dual-port memory 92. As long as $DBRAR_i$ 90 and $DBWAR_i$ 91 contain different addresses, read and write operations can be performed at the same time. The dual port memory 92 has Y superwords with addresses 0 through $Y-1$. A superword is used to store information for loading a DB in $BM_{i,j}$ into a transmitter. It has four fields: db_address, db_length_b, db_channel and db_loadtime, where db_address is the staring address of the given DB in $BM_{i,j}$, db_length_b is the number of bytes in the DB, db_channel $_{is}$ the identifier of the output data channel over which the DB is to be transmitted, and db_loadtime $_{is}$ the (relative) time at which the DB is scheduled to be loaded into the transmitter of the output channel specified by db_channel. The values of db_address and db_length_b are extracted from the BHP template of the DB, and the values of db_channel and db_loadtime are computed by $SCHEDULER_i$.

A slot counter $DBSC_{i,j}$ 94 is used to compute the values for the db_loadtime field. There is a decoder $DECODER_{i,j}$ 95 connected to $DBDR_{i,j}$ 93. This decoder is used to translate a superword of $DBCQ_{i,j}$ 66 read into $DBDR_{i,j}$ 93 into control signals for establishing a data path in the switching matrix from $BPU_{i,j}$ 40 to the transmitter 46 of the data channel specified by db_channel, and for performing loading the DB specified by db_address and db_length_b into this transmitter. $DBCQ_{i,j}$ 66 supports the following basic operations:

DBSC_DECREMENT: $DBSC_{i,j} \leftarrow DBSC_{i,j}-1$ if $DBSC_{i,j} \neq 0$ at every $CLK_s$ pulse.

DBSC_RESET: $DBSC_{i,j} \leftarrow 0$.

DATA_CHANNEL_LOAD: If $DBRAR_{i,j}=DBWAR_{i,j}$ then do nothing else do the following:
db_loadtime($DBRAR_{i,j}$)$\leftarrow$db_loadtime($DBRAR_{i,j}$)$-1$;
if db_loadtime($DBRAR_{i,j}$)=0 then use db_address($DBRAR_{i,j}$), db_length_b($DBRAR_{i,j}$), and db_channel ($DBRAR_{i,j}$) to initiate loading the corresponding DB in $BM_{i,j}$ into the transmitter 44 specified by db_channel($DBRAR_{i,j}$), and then perform $DBRAR_{i,j} \leftarrow (DBRAR_{i,j}+1)$ mod Y.

DBCQ_WRITE(W): $DBWAR_{i,j} \leftarrow DBWAR_{i,j}+1$; get a superword W from $SCHEDULER_i$ into $DBDR_{i,j}$ through $Bus_{i,2}$, and then write W in $DBDR_{i,j}$ into $DBCQ_{i,j}$ using the location specified by $DBWAR_{i,j}$.

Operation DATA_CHANNEL_LOAD is triggered by every clock pulse of $CLK_s$. Operation DBCQ-WRITE is performed after db-channel and db_loadtime of a DB are computed by $SCHEDULER_i$.

Figure 10:
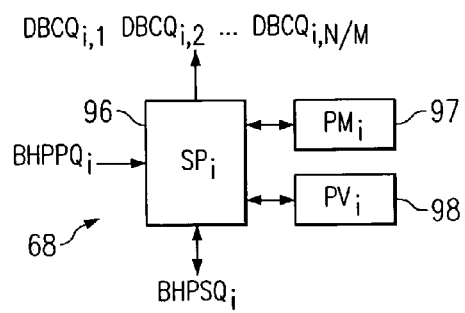
FIG. 10 illustrates a block diagram of a scheduling circuit used in the OLC of FIG. 6.

FIG. 10 illustrates a block diagram of a $SCHEDULER_i$ 68. The scheduler component $SCHEDULER_i$ of $BCU_i$, which is a component of $OLC_i$, includes a scheduling processor $SP_i$ 96, and associate processors $PM_i$ 97 and $PV_i$ 98.

Processor $SP_i$ repeatedly does the following: read a BHP template from $BHPPQ_i$, select a suitable output data channel for the corresponding DB, compute the transmitter loading (and transmission) times for the BHP and its corresponding DB. Processors $PM_i$ and $PV_i$ keep the status of all data channels. The scheduling results are sent to $BHPSQ_i$ and $DBCQ_{i,j}$, $1 \leq j \leq k$.

Figure 11:
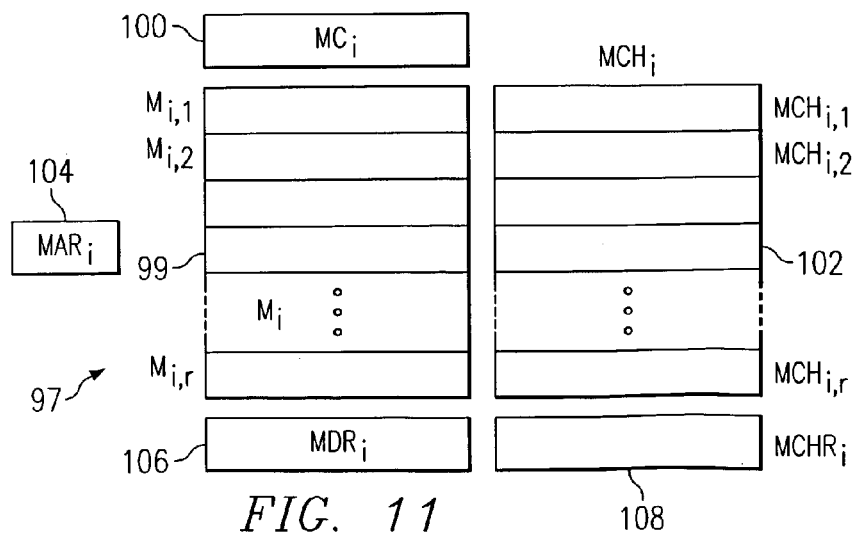
FIG. 11 illustrates an associative processor (PM) used in the scheduling circuit of FIG. 10.

FIG. 11 illustrates a block diagram of processor $PM_i$ 97. $M_i$ 99 is an associative memory of r words, $M_{i,1}, M_{i,2}, \ldots, M_{i,r}$, one for each channel of the data channel group. Each word is associated with a simple subtraction circuit for subtraction and compare operations. The words are also connected as a linear array. $MC_i$ 100 is a comparand register that holds an operand for comparison. $MCH_i$ 102 is a memory of r words, $MCH_{i,1}, MCH_{i,2}, \ldots, MCH_{i,r}$, which $MCH_{i,j}$ corresponding to $M_{i,j}$. The words are connected as a linear array, and they are used to hold the channel numbers. $MAR_i$ 104 is an address register used to hold address for accessing $M_i$ and $MCH_i$. $MDR_i$ 106 and $MCHR_i$ 108 are data registers. Together with $MAR_i$, they are used to access $M_i$ and $MCHR_i$.

Processor $PM_i$ supports the following operations:

PARALLEL_SUBTRACTION: For all words $M_{i,j}$, $1 \leq j \leq r$, do in $$\text{parallel}: M_{i,j} \leftarrow \begin{cases} M_{i,j} - MC_i, & \text{if } M_{i,j} > MC_i \\ 0, & \text{otherwise} \end{cases}$$

RANDOM-READ: Given address x in $MAR_i$, do $MDR_i \leftarrow M_{i,x}$, $MCHR_i \leftarrow MCH_{i,x}$.

RANDOM-WRITE: Given address x in $MAR_i$, do $M_{i,x} \leftarrow MDR_i$, $MCH_{i,x} \leftarrow MCHR_i$.

PARALLEL_SEARCH: The value of $MC_i$ is compared with the values of all word $M_{i,1}, M_{i,2}, \ldots, M_{i,r}$ simultaneously (in parallel). Find the smallest j such that $M_{i,j} < MC_i$, and do $MAR_i \leftarrow j$, $MDR_i \leftarrow M_{i,j}$, and $MCHR_i \leftarrow MCH_{i,j}$. If there is no word $M_{i,j}$ such that $M_{i,j} < MC_i$, $MAR_i = 0$ after this operation.

SEGMENT_SHIFT_DOWN: Given addresses a in $MAR_i$, perform $M_{i,j+1} \leftarrow M_{i,j}$ and $MCH_{i,j+1} \leftarrow MCH_{i,j}$, for all $a-1 \leq j < r$.

FIG. 12 illustrates a structure for the associative processor $PV_i$. $V_i$ 110 is an associative memory of k words, $V_{i,1}, V_{i,2}, \ldots, V_{i,k}$. Word $V_{i,j}$ is associated with $BPU_{i,j}$. Each word is associated with a simple subtraction circuit for subtraction operation. $VC_i$ 112 is a minuend register that holds a minuend. $VAR_i$ 114 is an address register used to hold an address for accessing $V_i$. $VDR_i$ 116 is a data register. Together with $VAR_i$, it is used to access $V_i$.

The associative processor $PV_i$ supports the following operations:

PARALLEL_SUBTRACTION: For all words $V_{i,j}$, $1 \leq j \leq k$, do in $$\text{parallel}: V_{i,j} \leftarrow \begin{cases} V_{i,j} - VC_i, & \text{if } V_{i,j} \geq VC_i \\ 0, & \text{otherwise} \end{cases}$$

RANDOM-READ: Given address x in $VAR_i$, do $VDR_i \leftarrow V_{i,x}$.

RANDOM-WRITE: Given address x in $VAR_i$, do $V_{i,x} \leftarrow VDR_i$.

The operation of the router 4 is discussed in relation to the preceding description of the preferred embodiment of the physical architecture of the router 4. It is assumed that DBs 24 are transmitted in units of slots (see FIG. 2) and BHPs as transmitted as groups, where each group is associated with a slot.

A slot clock, $CLK_s$ determines the slot boundary. The operation of loading a transmitter is triggered by $CLK_s$. FIG. 13 illustrates $CLK_s$ and a finer clock, $CLK_f$. The period of $CLK_s$ is a multiple of $CLK_f$. $CLK_f$ is used to coordinate operations performed within a period of $CLK_s$. This clock may be the same one used for synchronizing operations within scheduling processor $SP_i$ 96.

Regardless of the implementation details of the buffer in a transmitter, the load/transmission of a transmitter can be abstracted as a two-stage pipeline, as shown in FIG. 14. Loading a buffer (stage 120) involves establishing a path from a source BPU 40 to a destination transmitter 46, and initiating an operation that is similar to direct memory access (DMA). For the transmitter $Tx_{i,j}$, $1 \leq j \leq r$, of an output data channel, it is assumed that the transmission of a DB 24 is started after a constant $T_{load}^{DB}$ of slots since the time the load operation is triggered. After $T_{load}^{DB}$ slots, the transmission is started (stage 122) and the time for loading more slots is hidden. $T_{load}^{DB}$ is referred to herein as the effective loading time (or simply, loading time) for the transmitter 46 of a data channel 22. Let $T_{BM}$ be the number of $CLK_s$ cycles for one access of the burst memory (BM) 50 in a BPU 40. In order to make the pipeline work, $T_{BM*}Y$ bytes must be read from a BM 50 for every BM access, where Y is the number of bytes in a slot. Clearly, $T_{load}^{DB} \geq T_{BM}$, since $T_{load}^{DB}$ includes time for setting a path in BPU/transmitter switch $S_i$ 42.

Figure 15A:
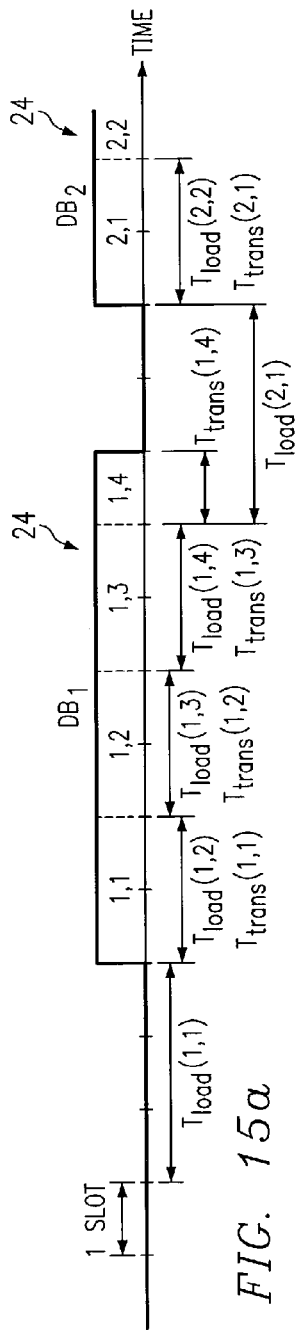
FIGS. 15a through 15c illustrate a first example of data burst loading an transmission.
Figure 15B:
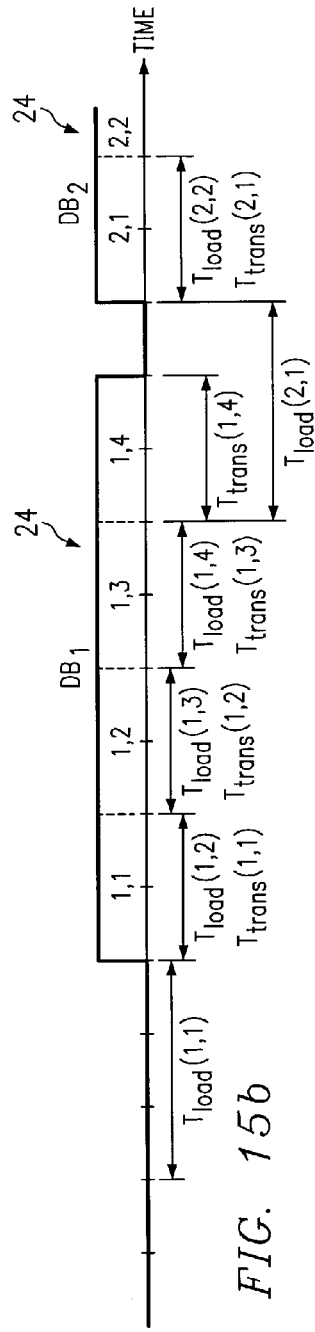
Figure 15C:
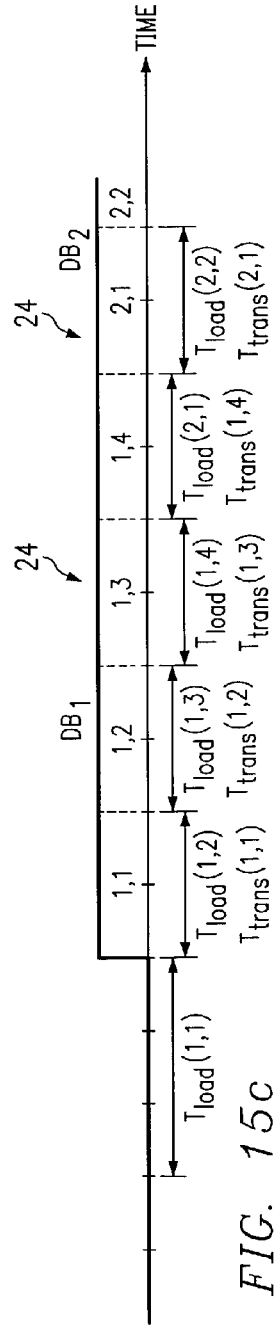

FIGS. 15a-c show the effect of pipelined load/transmission on one channel. A DB 24 is partitioned into several sections, shown by the dashed lines. $T_{load}$ and $T_{trans}$ are used to indicate the slot times for loading and transmitting these sections. In FIGS. 15a and 15b, $T_{load}^{DB}=3$, $T_{BM}=2$, and the data burst $DB_1$ contains seven and eight slots, respectively. Since loading $DB_1$ and loading $DB_2$ cannot be done simultaneously, slot waste is inevitable (two slot are wasted in the example of FIG. 15a and one slot is wasted in the example of FIG. 15b. In order to reduce the possibility of wasting slots, it is a great challenge to reduce the switching time of $S_i$ to negligible. In FIG. 15c, $T_{load}^{DB}=T_{BM}$, and $DB_1$ takes eight slots. The loading time for $DB_2$ is completely hidden. Note that even in the case of $T_{load}^{DB}=T_{BM}$, slot waste cannot be avoided in some situations. To see this, just consider that $T_{load}^{DB}=T_{BM}=2$ and $DB_1$ uses seven slots. Similarly, to fully utilize the control channel the effective loading time $T_{load}^{BHPS}$ for a BHP slot, in terms of number of slots, should be as small as possible. If $T_{load}^{BHPS}>1$, then slot waste is inevitable, as shown in FIG. 16a where $T_{load}^{BHPS}=2$. The challenge is to enforce $T_{load}^{BHPS}=1$ as shown in FIG. 16b so that the unnecessary slot waste can be avoided.

A method for scheduling DBs and BHPS is described herein. A method, SCHEDULE, is executed by $BCU_i$ 44. Given a burst header packet H'', a data channel $Ch_{i,t}$ is selected for transmitting a corresponding data burst DB'', H'' is inserted into a BHP slot BHPS'', the starting time for loading DB'' into transmitter $Tx_{i,t}$ 46 and the starting time for loading BHPS'' into transmitter $Tx_{i,r+1}$, are determined and the transmission times for DB'' and BHPS'' are determined. The following constants are used in the method:

r: the number of output data channels for output link i.

$T_{load}^{DB}$ the effective loading time, in terms of number of $CLK_s$ clock cycles, of each data transmitter $T_{load}^{BHPS}$ the effective loading time, in terms of number of $CLK_s$ clock cycles, of transmitter $Tx_{i,r+1}$. This is a constant.

$T_{offset}$: the number of slots from the $CLK_s$ pulse that triggers the transmission of a BHPS that contains BHP'' to the $CLK_s$ pulse that triggers the transmission of the first slot of BHP'' s corresponding DB. For an ingress edge router, this is a constant.

$T_{BM}$: memory access time of BM's in terms of slot clock cycles. This is a constant.

$T_{schedule}$: an upper bound of the time, in terms of $CLK_f$ cycles, for executing one iteration of procedure $SCHEDULE_i$. This is a constant.

The slot time at which loading a BHPS (resp. DB) into a transmitter is initiated is called the load starting time of the BHPS (resp. DB). The following mathematical variables (without limitation on word length) for representing time are needed:

$t^{i,j}_{load\_available}$, $1 \leq j \leq r$: the earliest available time for lading a new DB 24 into transmitter $Tx_{i,j}$ 46.

$t^{i,j}_{bpu\_available}$, $1 \leq j \leq k$: the earliest available time for initiating loading a DB 28 from $BPU_{i,j}$ 40 to any transmitter 46.

$t^i_{min\_bhps\_load}$: the earliest eligible time for loading a BHPS of the new DB 24 into $Tx_{i,r+1}$ 46.

The SCHEDULE method is based on the slot transmission mode. In this mode, loading a data burst transmitter 46 and data transmission can only be triggered by a $CLK_s$ pulse. Since the effective loading time is $T_{load}^{DB}$ for a data burst DB" of arbitrary number of slots, the load and transmission operations for DB" overlap due to pipelining, and the transmission of DB" starts exactly $T_{load}^{DB}$ slots after the start of loading DB". Therefore, once the loading time of DB" is known, the transmission time of DB" is implied. The DB" load triggering $CLK_s$ pulse can be used to generate the triggering signal for the transmission of DB". A transmitter 46 is "available" if it is available for lading. It is possible that a transmitter is available while it is still in the state of transmission. This can be easily observed using the two-stage pipelining model (see FIGS. 14, 15 and 16). Based on the two-stage pipeline model, $t^{i,j}_{db\_available} \leftarrow t^{i,j}_{db\_load} + T_{load}^{DB} + (\lceil H".db\_length\_s/T_{BM}\rceil - 1) T_{BM}$, where $t^{i,j}_{db\_available}$ is the earliest available time slot for transmitter $Tx_{i,j}$ after loading DB" into $Tx_{i,j}$ is started, and H" is the BHP 28 of DB".

Similarly, loading and transmission operations of the transmitter for transmitting BHPS's can only be triggered by a $CLK_s$ pulse. Since a BHPS is one slot, the transmission time slot for BHPS, over $Ch_{i,r+1}$ is the earliest available slot for loading a new BHPS into $Tx_{i,r+1}$ after loading $BHPS_c$.

Let H" be the BHP being considered, and let DB" be its corresponding DB. The SCHEDULE method schedules H" and DB" by performing the following two major steps:

method SCHEDULE
  repeat forever
    begin
      if the remaining time in the current slot cycle is no less
        than $T_{schedule}$ then
      begin
        if $BHPPQ_i$ is not empty and $flag_i=0$ then get a BHP
          template H from $BHPPQ_i$;
        if $flag_i=1$ or $BHPPQ_i$ is not empty and $flag_i=0$ then
        begin
          j←H.bpu_identifier;
          j"←min{a\\$t^{i,a}_{load\_available} \geq t^{i,j}_{bpu\_available}$};
          H.db_channel←j';
          construct BHP H" from BHP template H;
          $t^i_{min\_bhps\_load} \leftarrow \max\{t^{i,j}_{load\_available} + t_{load}^{DB} - T_{offset}, current\_time+1\}$;
          if there is a superword in $BHPSQ_i$ with location b
            such that the load staring time of this superword
            is no less than $t^i_{min\_bhps\_load}$ and there is enough
            space in this superword to accommodate H" and
            $DBCQ_{i,j}$ is not full then
          begin
            find such as superword whose load starting time is
              minimum in $BHPSQ_i$; insert H" into this superword and update $BHPSQ_i$;
            compute the load starting time for DB" that corresponds to H";
            computer the new $t^{i,j}_{bpu\_available}$ and
              $t^{i,j'}_{load\_available}$;
            insert a superword for DB" into $DBCQ_{i,j}$;
            $flag_i \leftarrow 0$
          end
          else $flag_i \leftarrow 1$
        end
      end
    end Implementation of the SCHEDULE methods is discussed in relation to the OLC hardware described above. There are k OLCs 32, $OLC_i$, $1 \leq i \leq k$. Assuming that all OLCs 32 have the same architecture, then $BCU_i$ 42 of $OLC_i$ 32 runs process $SCHEDULE_i$, processing the BHP 28 and DBs 24 for $OLC_i$ 32. All processes $SCHEDULE_i$, $1 \leq i \leq k$, are executed in parallel.

Relative time is used for scheduling. For each $BCU_i$, two counters, $CS_i$ and $CF_i$, are used to represent the relative times. Counter $CS_i$ is an increment counter. It is incremented by one on every clock pulse of $CLK_s$. It can be reset to 0 at any time by a reset operation $CS_i \leftarrow 0$. Once its value reaches a predetermined value $MAX_s$ its value remains to be $MAX_s$. It resumes counting after a $CS_i \leftarrow 0$ operation is performed. The value of $MAX_s$ is chosen to be a value that is larger than the sum of the longest permissible length DB length, the size X of BHPSQ, the offset between a BHP and its DB, and $t_{load}^{BHPS}$, in terms of slots. Clearly, if the current $CS_i$ value is not $MAX_s$, then it is the relative (elapsed) time from the execution of the last reset operation to the current time in terms of number of slot times. If the current $CS_i$ value is $MAX_s$, then the relative (elapsed) time from the execution of the last reset operation to the current time is at least $MAX_s$ slot times.

Counter $CF_i$ is a circular decrement counter. It is decremented by one by every clock pulse of $CLK_f$. Once its value reaches 0, it is reset to a predetermined value $MAX_f$ upon receiving the next pulse of $CLK_f$, and counting continues. Counters $CS_i$ and $CF_i$ are precisely synchronized. The period of $CLK_s$ is $MAX_f$ times the period of $CLK_f$, and at each pulse of $CLK_s$, $CF_i$ is reset to $MAX_f$. At any given time, the value of $CF_i$ can be used as an indicator of the time left, in terms of number of $CLK_f$ pulses, within the current $CLK_s$ period.

The r variables $t^{i,j}_{load\_available}$, $1 \leq j \leq r$, are used to record the availability status of data channel transmitters of $OLC_i$. The k variables $t^{i,j}_{bpu\_available}$, $1 \leq j \leq k$, are used to record the availability status of BPUs of $OLC_i$. These r+k variables serve as a data base for scheduling a new pair of BHP and DB. This "data base" is updated after scheduling each pair of BHP and DB.

The variables $t^{i,j}_{bpu\_available}$ are implemented by the associative processor $PV_i$. Word $V_{i,j}$ stores $t^{i,j}_{bpu\_available}$. Since the word length for $V_{i,j}$ is fixed, the values of $t^{i,j}_{bpu\_available}$ stored in $V_i$ are periodically updated as the relative times, with values relative to the current time, which is the starting slot time of the current iteration of $t^i_{min\_bhps\_load}$. To maintain correct relative time values stored in $V_i$, PARALLEL_SUBTRACTION operation is performed within each iteration of $SCHEDULE_i$, with minuend being the current value of $CS_i$ that contains the elapsed slot time since the last iteration.

The variables $t^{i,j}_{load\_available}$ are implemented by the associative processor $PM_i$ in the following way: $MCH_{i,x}=j$, if and only if $M_{i,x} = t^{i,j}_{db\_available}$. The values of $t^{i,j}_{load\_available}$ stored in $M_i$ are preiodallcy updated as the relative times, with values relative to the current time, which is the starting slot time of the current iteration of $SCHEDULE_i$. To maintain correct relative time values stored in $M_i$, PARALLEL_SUBTRACTION operation is performed within each iteration of $SCHEDULE_i$, with minuend being the current value of $CS_i$ that contains the elapsed slot time since the last iteration. The values in $M_i$ of $PM_i$ are maintained in non-decreasing order so that the operation j'←min{a\\$t^{i,a}_{load\_available} - t^{i,j}_{bpu\_available}$} can be carried out by a PARALLEL-SEARCH operation on $M_i$. PARALLEL_SEARCH, SEGMENT-SHIFT-DOWN, and RANDOM-WRITE operations on $M_i$ are used to update $M_i$ and enforce the sorted order of superwords in $M_i$.

At any time, the value of read register $RAR_i$ of $BHPSQ_i$ is considered as current time, which is used as the reference point 0 for relative times. Thus, the values of $t^i_{min\_bhps\_load}$ computed based on the values stored in $M_i$ and $V_i$ is also a relative time.

The queues $DBCQ_{i,j}$, $1 \leq j \leq r$, and $BHPSQ_i$ are used to store the output of $SCHEDULE_i$. The BHP slot queue $BHPSQ_i$ is a circular queue and it is used to store all BHP slots (BHPS's) for transmission over channel $Ch_{i,r+1}$. Each superword in $DBCQ_{i,j}$ is used to store the information from the initiation of load and transmission operations of one DB.

As mentioned above, the value of $RAR_i$ is considered as current time. The load starting time of the BHPS stored in address y of $BHPCQ_i$ is $(y-RAR_i)$ mod X, which is the slot time relative to the current time. That is, loading the BHPS stored in address y of $BHPCQ_i$ into transmitter $Tx_{i,r+1}$ will start right after $(y-RAR_i)$ mod X $CLK_s$ clock cycles from the current time. If a BHPS is scheduled to be loaded at the $z^{th}$ slot time after the current time, this BHPS must be stored in the superword with address $(RAR_i+z)$ mod X. Since $RAR_i$ is a circular counter whose value increments by 1 by every $CLK_s$ pulse, and the maximum value of $RAR_i$ is $X-1$. The following process in $BCU_i$ is activated by every $CLK_s$ pulse:

process BHPS_LOAD-TRIGGERING_i
    begin
        perform CONTROL_CHANNEL_LOAD operation
    end Each $DBCQ_{i,j}$ is a circular queue that is in a form different from $BHPSQ_i$. The information for loading a new DB" that is stored in $BPU_{i,j}$ is written into $DBCQ_{i,j}$ by a DBCQ_WRITE operation. The field db_loadtime of superwords in $DBCQ_{i,j}$ is used to record the load starting times of scheduled DBs of $BPU_{i,j}$. Let db_loadtime(a) denote the db_loadtime value of the superword with address a. Let db_loadtime($DBRAR_{i,j}$), db_loadtime($(DBRAR_{i,j}+1)$ mod Z), ... , db_loadtime $((DBRAR_{i,j}+x-1)$ mod Z) be the values of the db_loadtime fields of x consecutive superwords starting from the address specified by register $DBRAR_{i,j}$, and assume that db_loadtime $(DBRAR_{i,j}) \neq 0$. Then, the load starting time of the DB whose control superword is db_loadtime($(DBRAR_{i,j}+b)$ mod Z), $1 \leq b \leq x-1$, is exactly $\Sigma_1^b$ db_loadtime($(DBRAR_{i,j}+b)$ mod Z) slots after the load starting time of the DB whose load starting time is in db-loadtime($DBRAR_{i,j}$). The computation of values in the db_loadtime of $DBCQ_{i,j}$ is facilitated by counter $DBSC_{i,j}$. The following process in $BCU_i$ is activated by every $CLK_s$ pulse:

process DB_LOAD_TRIGGERING_i_j
    begin
        perform CONTROL_CHANNEL_LOAD_i_j operation
    end An implementation of the SCHEDULE method is described in terms of the OLC hardware. This implementation is executed by scheduling processor $SP_i$. A pair of language constructs "do-in-parallel" and "end-do" are used to enclose operations that can be performed in parallel.

process $SCHEDULE_i$
  repeat forever
    begin
      do-in-parallel
        $EF_i \leftarrow CF_i$; $CF_i \leftarrow 0$
      end-do
      if $EP \geq T_{schedule}$ then
        begin
          if $BHPPQ_i$ is not empty and $flag_i=0$ then read a BHP template H from the head of $BHPPQ_i$;
          if $flag_i=1$ or $BHPPQ_i$ is not empty and $flag_i=0$ then
          begin
          \* update relative times *\
          do-in-parallel
            $ES_i \leftarrow CS_i$; $MC_i \leftarrow CS_i$; $VC_i \leftarrow CS_i$; $CS_i \leftarrow 0$
          end-do
          do-in-parallel
          perform PARALLEL_SUBTRACTION operation on $M_i$;
          perform PARALLEL_SUBTRACTION operation on $V_i$;
          end-do
          $j \leftarrow H.bpu\_identifier$;
          \* get $t^{i,j'}_{bpu\_available}$ from V into $VDR_i$ *\
          $VAR_i \leftarrow j$;
          perform RANDOM-READ operation on $V_i$;
          \* find j' and $t^{i,j'}_{load\_available}$ *\
          $MC_i \leftarrow VDR_i$;
          perform PARALLEL-SEARCH operation on $M_i$;
          \* now, j' is in $MCHR_i$, $t^{i,j'}_{load\_available}$ is in $MDR_i$, *\
          \* and $MAR_i$ contains the address of $t^{i,j'}_{load\_available}$ in $MAR_i$*\
          $H.db\_channel \leftarrow MCHR_i$;
          extract BHP H" from BHP template H;
          \* compute $t^i_{min\_bhps\_load}$*\
          $t^i_{min\_bhps\_load} \leftarrow min\{MDR_i + T_{load}^{DB} + T_{offset}, RAR_{i,1}+1\}$;
          \* find a superword in $BHPSQ_i$ for H" *\
          if $t^i_{min\_bhps\_load} > X$ then $notfound_i \leftarrow 1$;
          if $notfound_i = 0$ then
          begin
          $RC_i \leftarrow H".bhp\_length$;
          $RAR_{i,2} \leftarrow X-1$;
          perform PARALLEL-SEARCH1 operation on $BHPSQ_i$;
          if $RAR_{i,3}=0$ then perform PARALLEL_SEARCH2 operation on $BHPSQ_i$;
          if $RAR_{i,3}=0$ then $notfound_i \leftarrow 1$;
          if $notfound_i=0$ and $RDR_i \geq H".bhp\_length$ and $DBWAR_i + 1 \neq DBRAR_i$
          then
          begin
          \* insert H" into $BHPSQ_i$ *\
          perform BHPSQ_WRITE (H") operation on $BHPSQ_i$;
          \* computer the load starting time $t^i_{bhp\_load}$ for H" *\
          if $RAR_{i,3} \geq RAR_{i,1}$ then $t^i_{bhp\_load} = RAR_{i,3} - RAR_{i,1}+1$
          else $t^i_{bhp\_load} = X - RAR_{i,1} + RAR_{i,3}+1$;
          \* compute the load starting time $t^{i,j'}_{db\_load}$ relative to $RAR_{i,1}$, for D" *\
          $db\_loadtime_1^i \leftarrow t^i_{bhp\_load} + T_{offset} - T_{load}^{DB}$;
          \* compute the load starting time $t^{i,j'}_{db\_load}$ relative to the load starting *\
          \* time of the previous DB in $DBCQ_{i,j}$ *\
          $db\_loadtime_2^i \leftarrow db\_loadtime_1^i - DBSC_{i,j}$;
          perform DBSC_RESET operation on $DBSC_{i,j}$;
          \* compute new $t^{i,j'}_{load\_available}$ and $t^{i,j'}_{bpu\_available}$, which have *\
          \* the same value $available_i$ *\
          $available_i \leftarrow db\_loadtime_1^i + T_{load}^{DB} + (\lceil H".db\_length\_s/T_{BM}\rceil - 1)T_{BM}$
          \* insert the superword for DB" into $DBCQ_{i,j}$ *\
          perform DBCQ_WRITE (H.db_address|H.db_length_b| j'|db_loadtime$_2^i$);
          \* update $M_i$ and $V_i$ *\
          $MC_i \leftarrow available^i$;
          $MDR_i \leftarrow available^i$;
          $VDR_i \leftarrow available^i$;
          do-in-parallel

```
        perform PARALLEL_SEARCH operation on PM_i;
        perform WRITE operation on PV_i
        end-do
        perform SEGMENT_SHIFT_DOWN operation
            on PM_i;
        \* signal that the scheduling is successful *\
        flag_i 1
        end
      end
    end
  end
end
```

In an ingress edge router that has k OLCs, $OLC_i$, $1 \leq i \leq k$, and each $OLC_i$ has r data channels $Ch_{i,j}$, $1 \leq j \leq r$, and a control channel $Ch_{i,r+1}$, the following program describes the initialization of all OCLs, and the activation of all the channel scheduling processes are transmitter load and transmission processes. Since the transmission of a BHPS and a DB is started a constant $T_{load}^{BHPS}$ and $T_{load}^{DB}$ after the load staring time of the BHPS and DB, respectively, the transmission control processes are implied by processes BHP_TRIGGERING_i_j and DB_LOAD_TRIGGERING_i_j.

```
procedure Schedule_Main
  begin
    \* initialize all PM_is *\
    Set all words in M_i to be 0s, MCHR_{i,j}←j, for 1≤i≤k,
        1≤j≤r;
    \* initialize all PV_is *\
    Set all words in V_i to be 0s, for 1≤i≤k, 1≤j≤r;
    \* initialize all BHPSQs *\
    RAR_i←0, WAR_i←1, R_{i,q}←Y, for 1≤i≤k, 1≤q≤X-1;
    \* initialize all DBCQs *\
    DBRAR_{i,j}←0, DBWAR_{i,j}←0, for 1≤i≤k, 1≤j≤r;
    \* initialize all counters *\
    CS_i←0, CF_i←MAX_f, for 1≤i≤k;
    \* initialize all DBSC counters *\
    DBSC_{i,j}←0, for 1≤i≤k, 1≤j≤r;
    do-in-parallel
      execute SCHEDULE_i for 1≤i≤k;
      enable the activation of processes BHP_TRIGGER-
          ING_i_j and DB_LOAD_TRIGGERING_i_j, for
          1≤i≤k, 1≤j≤r
    end-do
  end
```

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

The invention claimed is:

1. An ingress edge router coupled between a set of input links carrying information packets and a set of output optical links in an optical network carrying optical data bursts and related control information, comprising:
   a plurality of input line cards coupled to said set of input links, wherein said input line cards receive information packets from said set of input links;
   a plurality of output line cards coupled to at least one of said output optical links, wherein said output line card assemble information packets into data bursts, generate burst header packets for respective data bursts, and transmit said data bursts as optical data bursts and separate burst header packets on one or more of said output optical links, wherein each of the plurality of output line cards includes:
   a plurality of burst processing units for assembling data from said information packets into data bursts, wherein said burst processing units further generate burst header packet information for each data burst;
   a plurality of transmitters for transmitting data bursts on a respective channel of an output link;
   a switch for passing data burst from the plurality of burst processing units to the plurality of transmitters;
   a burst control unit for scheduling the transmission of data bursts between the plurality of burst processing units and the plurality of transmitters;
   data burst queues corresponding to each burst processing unit for storing data bursts ready to be transmitted;
   a burst header packet queue for storing burst header packet information for data bursts ready to be transmitted;
   a collecting processor for collecting burst header packet information from said burst processing units according to a first priority scheme and storing the burst header packet information in the burst header packet queue according to a second priority scheme;
   a slot queue for storing burst header packets corresponding to data bursts ready to be transmitted; and
   a scheduling processor for storing attributes in said data burst queues, said attributes corresponding to data bursts stored in said burst processing units, and for storing burst header packets in said slot queue responsive to information in said burst header packet queue; and
   a switching matrix for transferring packets from the input line cards to the output line cards for transmission on the desired output optical link.

2. The ingress edge router of claim 1 wherein said burst processing units comprise:
   a processing device;
   a memory coupled to the processing device for storing data burst information.

3. The ingress edge router of claim 1 wherein the collecting processor polls the burst processing units for burst header packet information in a predetermined order.

4. The ingress edge router of claim 1 wherein the collecting processor polls the burst processing units for burst header packet information using a round robin priority scheme.

5. The ingress edge router of claim 1 burst header packet information is stored in the burst header packet queue according to a value in a data type field.

6. The ingress edge router of claim 1 wherein burst header packets are stored in said slot queue as groups for transmission as a data unit.

7. The ingress edge router of claim 6 wherein said slot queue includes a dual ported memory.

8. The ingress edge router of claim 1 wherein said attributes include address information of the corresponding data burst in the memory of the corresponding burst processing unit.

9. The ingress edge router of claim 1 wherein said scheduling processor further selects a suitable transmitter for transmitting each data burst.

10. The ingress edge router of claim 9 wherein said scheduling processor determines a first available transmitter for transmitting each data burst.

11. The ingress edge router of claim 10 wherein said switch simultaneously loads data bursts from multiple burst processing units to multiple transmitters responsive to said scheduling processor.

12. The ingress edge router of claim 1 wherein said transmitters are pipelined to load and transmit optical data bursts simultaneously.

13. The ingress edge router of claim 1 wherein optical data bursts are transmitted responsive at slot boundaries.

14. The ingress edge router of claim 13 wherein burst header packets are transmitted in groups at slot boundaries.

15. The ingress edge router of claim 14 and further including a slot clock for defining slot boundaries.

16. The ingress edge router of claim 15 and further including a operation clock having a frequency which is a integer multiple of the slot clock for coordinating operations performed within a period of the slot clock.

17. A method of generating optical bursts on a set of output optical channels from packets on a set of input links, comprising the steps of:

receiving packets from said input links on respective input line cards and routing packets through a switching matrix to output line cards;

assembling the information packets into data bursts in the output line cards;

generating burst header packets for respective data bursts in the output line cards;

scheduling transmission of optical data bursts on one or more of the output optical channels, wherein said scheduling step comprises the steps of:

collecting burst header packet information from a plurality of burst processing units according to a first priority scheme; and storing burst header packet information in a burst header packet queue using a second priority scheme;

storing attributes in data burst queues associated with each burst processing unit, said attributes corresponding to data bursts stored in said burst processing units;

storing burst header packets in a slot queue responsive to information in said burst header packet queue; and transmitting the data bursts and burst header packets as optical data bursts and optical burst header packets on the one or more of the output optical channels.

18. The method of claim 17 wherein the collecting step comprises the step of polling the burst processing units for burst header packet information in a predetermined order.

19. The method of claim 17 wherein the collecting step comprises the step of polling the burst processing units for burst header packet information using a round robin priority scheme.

20. The method of claim 17 wherein said burst header packet information is stored in the burst header packet queue according to a value in a data type field.

21. The method of claim 17 wherein said step of storing burst header packets in a slot queue comprises the step of storing burst header packets in the slot queue in groups for transmission as a data unit.

22. The method of claim 17 said step of storing attributes includes the step of storing address information for data bursts stored in a memory of the corresponding burst processing unit.

23. The method of claim 17 wherein said scheduling step includes the step of determining a first available transmitter for transmitting each data burst.

24. The method of claim 23 wherein said scheduling step further comprises the step of loading data bursts from multiple burst processing units to multiple transmitters.

25. The method of claim 17 wherein said transmitting step comprises the step of transmitting data bursts as optical data bursts on predetermined slot boundaries.

26. The method of claim 25 wherein burst header packets are transmitted in groups as optical burst header packets on said predetermined slot boundaries.

* * * * *